United States Patent
Santoni

(10) Patent No.: US 8,733,827 B2
(45) Date of Patent: May 27, 2014

(54) COMPOSITE TUB STRUCTURE FOR VEHICLE

(75) Inventor: Claudio Santoni, Guildford (GB)

(73) Assignee: McLaren Automotive Limited, Woking, Surrey (GB)

( * ) Notice: Subject to any disclaimer, the term of this patent is extended or adjusted under 35 U.S.C. 154(b) by 0 days.

(21) Appl. No.: 13/634,804

(22) PCT Filed: Mar. 17, 2011

(86) PCT No.: PCT/EP2011/054082
§ 371 (c)(1), (2), (4) Date: Feb. 8, 2013

(87) PCT Pub. No.: WO2011/113912
PCT Pub. Date: Sep. 22, 2011

(65) Prior Publication Data
US 2013/0134741 A1  May 30, 2013

(30) Foreign Application Priority Data
Mar. 17, 2010 (GB) .................................. 1004471.7

(51) Int. Cl.
*B60N 99/00* (2006.01)
(52) U.S. Cl.
USPC .................................................. 296/203.01
(58) Field of Classification Search
USPC ........................................ 296/203.01, 193.04
See application file for complete search history.

(56) References Cited

U.S. PATENT DOCUMENTS 5,020,846 A * 6/1991 Bonnett ...................... 296/181.4
5,538,309 A * 7/1996 Murray ............................ 296/64
5,975,625 A * 11/1999 Simplicean ..................... 296/205
6,073,991 A * 6/2000 Naert ......................... 296/187.02
6,206,458 B1   3/2001 Schroeder et al.
2005/0127716 A1 * 6/2005 McLeod ................... 296/203.01

FOREIGN PATENT DOCUMENTS

| EP | 0240470 A1 | 10/1987 |
| EP | 1375310 A2 | 1/2004 |
| GB | 2311966 A | 10/1997 |
| WO | 2009024883 A1 | 2/2009 |

* cited by examiner

*Primary Examiner* — Lori Lyjak
(74) *Attorney, Agent, or Firm* — Haynes Beffel & Wolfeld LLP

(57) ABSTRACT

A moulded structural tub for a vehicle, the tub having: a main compartment bounded by a first lateral wall, a second lateral wall, and a floor extending between the lateral walls; a strengthening member integral with the first lateral wall and projecting in a longitudinal direction from the first lateral wall towards the second lateral wall; the profile of the surfaces of the main compartment being such that, in any cross-sectional plane parallel to the longitudinal direction and perpendicular to the plane generally defined by the floor, the length of a line drawn in that cross-sectional plane between a fixed point on that part of the strengthening member closest to the second lateral wall, and a movable point confined to the profile monotonically increases in length as the movable point on the profile is moved in a generally longitudinal direction so as to trace from the fixed point along the profile of the first lateral wall, the floor and the second lateral wall in an unbroken set of points representing the cross-section of the surfaces of the main compartment in that cross-sectional plane; wherein each of the said cross-sectional planes which meet the surface of the floor in the main compartment intersect the floor once along a single continuous line or at a common plane.

21 Claims, 2 Drawing Sheets

US 8,733,827 B2

COMPOSITE TUB STRUCTURE FOR VEHICLE

BACKGROUND OF THE INVENTION

This invention relates to a moulded structural tub for a vehicle. In particular the invention relates to a fibre reinforced composite tub having a shape selected so as to be suitable for resin transfer moulding.

Fibre reinforced composite materials (or "composites") such as carbon fibre reinforced polymers (CFRP) are being increasingly used in automobiles, particularly sports cars, because such materials can provide a high strength to weight ratio. Replacing conventional metal structures with composite materials allows the weight of an automobile to be reduced, which improves performance and reduces emissions. Because of their strength, composites are particularly suitable for use in the structural components of an automobile. However, the use of such composites are limited by their expensive. The material parts of the composite are themselves expensive (carbon fibre is especially expensive) but, particularly for larger components, a significant part of the cost lies in their manufacture.

Less complex, smaller composite components can be made using moulding techniques such as resin transfer moulding (RTM), which can be readily scaled up for mass production. Body panels, vehicle trim and strengthening beams can often be made in this way. But more complex and larger components are conventionally laid-up by hand using prepreg structures (arrangements of composite fibres pre-impregnated with the matrix material used to bond the fibres together) and cured in an autoclave. This can be a very time-consuming process, and preparing and laying-up the prepreg structures requires expensive skilled labour.

One particular example of a complex composite structure which is currently manufactured using a prepreg and autoclave technique is the composite tub used as the basic structural platform in some racing cars. Such tubs are large parts and require a complex structure in order to give them sufficient strength and stiffness. These composite tubs are now finding their way into high-performance sports cars which can benefit from the excellent strength and stiffness provided by a composite tub. However, because of the expense of manufacturing a composite tub using a prepreg and autoclave technique, the use of composite tubs is limited to very expensive "supercars".

The large and complex structures of a tub are manufactured using a prepreg and autoclave technique because any moulding tool capable of making a conventional tub would itself have to be large and complex, having many tool parts which can operate together to provide a suitable mould for the tub but which also allow the tub to be released from the mould once it is complete. Aside from the difficulties inherent in making large and complex structures using composite moulding techniques such as RTM, this complexity means the tool would be very expensive. Since tubs are often only manufactured in small numbers (e.g. in the case of racing cars and supercars), the cost of the moulding tool would often outweigh the cost benefit of using faster and less labour-intensive moulding techniques.

Complex structures can be made from moulded composite materials by gluing together more straightforward pieces which can be made using moulding techniques, but the bonds between the pieces form weak spots in the structure at which failure is more likely to occur. It should also be noted that the complexities of a structure generally lie in the features which give the structure strength, such as box sections, corrugations and edges.

It would be desirable if composite structural tubs could be manufactured using less expensive and less labour-intensive techniques which allow the rapid manufacture of tubs for vehicles. This would mean automobile manufactures could use composite tubs in cars assembled according to high volume processes, allowing their use in less expensive cars.

There is therefore a need for a composite single-piece tub structure suitable to be manufactured using moulding techniques, without compromising the strength of the tub design. There is also a need for a composite single-piece tub structure that can be made by such moulding techniques in high volumes using a moulding tool having a minimal number of tool parts.

SUMMARY OF THE INVENTION

According to the present invention there is provided a moulded structural tub for a vehicle, the tub having: a main compartment bounded by a first lateral wall, a second lateral wall, and a floor extending between the lateral walls; a strengthening member integral with the first lateral wall and projecting in a longitudinal direction from the first lateral wall towards the second lateral wall; the profile of the surfaces of the main compartment being such that, in any cross-sectional plane parallel to the longitudinal direction and perpendicular to the plane generally defined by the floor, the length of a line drawn in that cross-sectional plane between a fixed point on that part of the strengthening member closest to the second lateral wall, and a movable point confined to the profile monotonically increases in length as the movable point on the profile is moved in a generally longitudinal direction so as to trace from the fixed point along the profile of the first lateral wall, the floor and the second lateral wall in an unbroken set of points representing the cross-section of the surfaces of the main compartment in that cross-sectional plane; wherein each of the said cross-sectional planes which meet the surface of the floor in the main compartment intersect the floor once along a single continuous line or at a common plane.

The strengthening member can be one of a substantially hollow beam, a flat sheet, a curved sheet and a multi-faceted sheet comprising a plurality of sheet sections.

Preferably the strengthening member is remote from the floor along its length.

Preferably the first lateral wall terminates at the strengthening member along the edge of the first lateral wall remote from the floor.

Preferably, in all said cross-sectional planes the angle between the first lateral wall and that part of the strengthening member closest to the floor is greater than 90 degrees.

The moulded structural tub can further comprise third and fourth lateral walls bounding the main compartment, each of the third and fourth lateral walls extending between the first and second lateral walls and meeting the floor along a common lateral edge.

Preferably the strengthening member extends between the third and fourth lateral walls.

Preferably each of the said cross-sectional planes which meet the third or fourth walls in the main compartment intersect the third or fourth wall once along a single continuous line or at a common plane.

Preferably the second lateral wall comprises either a single curved section or multiple curved or planar sections so as to increase the torsional stiffness of the moulded structural tub about the longitudinal direction.

Preferably the profile of the surfaces of the main compartment is configured such that a single rigid tool part of a moulding apparatus, having dimensions such that when the tool part is positioned in the main compartment the tool part snugly abuts all the surfaces of the main compartment, can be removed from the main compartment by a motion including rotation about the strengthening member without deformation to the moulded tub.

Preferably the single rigid tool part can be removed from the main compartment by a motion including rotation about an axis perpendicular to the longitudinal direction in a plane perpendicular to the plane generally defined by the floor.

Preferably the single rigid tool part can be removed from the main compartment by a motion including rotation about an axis generally defined by the complete set of fixed points of the said cross-sectional planes.

Preferably the moulding apparatus is a resin transfer moulding apparatus and the tub is moulded by resin transfer moulding.

Preferably all parts of the tub are moulded together in a single fibre reinforced composite piece.

Preferably the tub is made from carbon fibre reinforced polymer.

Preferably the tub is a structural platform for an automobile and the main compartment of the tub is configured to partially enclose at least one seating position for an occupant of the vehicle.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

This invention relates to moulded structural tubs for vehicles, in particular cars, but the tub could be for an aircraft, boat or other vehicle. A tub is a structural platform of a vehicle which substantially provides the torsional stiffness of the vehicle. The general shape of a tub is configured so as to provide an open main compartment in which at least one occupant of the vehicle is to be situated during use of the vehicle. In use a tub partially envelopes one or more occupants of the vehicle so as to protect the occupants in the event of a crash.

Figure 1:
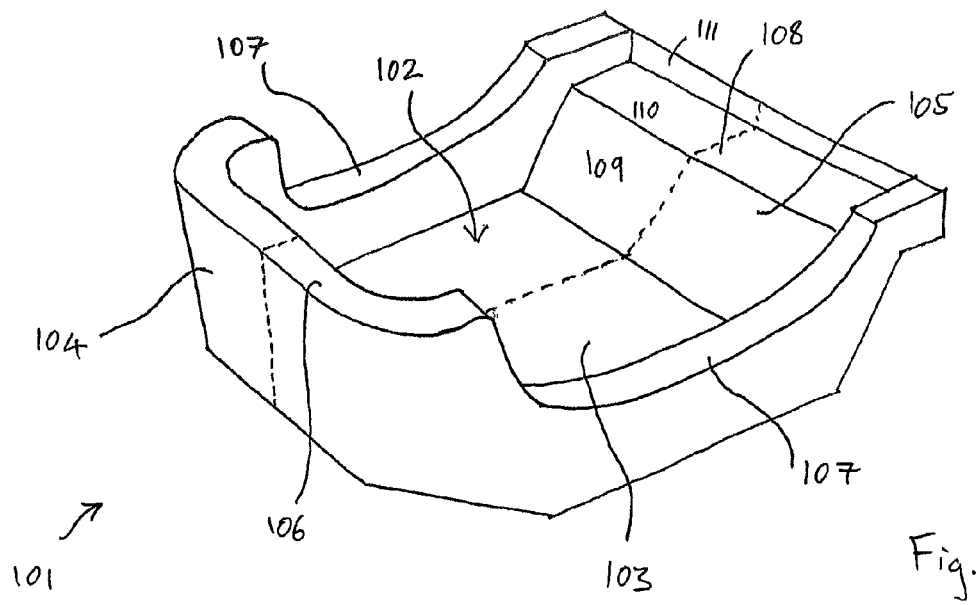
FIG. 1 is a schematic drawing of a composite tub for a vehicle configured in accordance with the present invention.

A composite tub configured in accordance with the present invention is shown in FIG. 1. The tub 101 comprises at least front wall 104, rear wall 105 and floor 103, which are configured so as to define a main compartment 102. The main compartment is the cavity bounded by the floor and the front and rear walls (and possibly side walls) of the tub and includes any cavities in the walls or floor. Integrated with front wall 104 is a strengthening member 106 which projects in a rearward direction towards rear wall 105. Because the strengthening member of the tub in the figure projects into the compartment from the front wall, the structure of the strengthening member is not apparent in FIG. 1 which shows a front perspective view of the tub.

The strengthening member could be a thin shelf projecting from the front wall or any other shape configured to impart torsional stiffness to the tub, but it is preferably a substantially hollow beam. The strengthening member is preferably flush with the top of the front wall, remote from the floor.

It is further preferable that the tub comprises side walls 107, which contribute to the strength and stiffness of the tub and further define compartment 102. Side walls 107 may be single or multiple layers of composite material, but it is most advantageous if the side walls are substantially hollow sills. Such structures can significantly increase the strength and stiffness of the tub. Preferably the strengthening member does not meet the side walls at an abrupt angle and instead curves progressively to meet the side walls. This helps to distribute stresses acting on the strengthening member over the side walls, and vice versa.

The walls and floor of the tub may each comprise multiple sections. For example, rear wall 105 essentially comprises three planar sections 109, 110 and 111. It can be advantageous for the floor to include a longitudinal ridge running between the front and rear walls. Such a ridge can provide additional strength and stiffness to the tub and could define a tunnel through the tub which could be used to accommodate a transmission shaft or a conduit for electrical cables etc. Note that the lateral extension of the floor between the front and rear walls generally defines a horizontal plane, even if the floor includes multiple sections such as might define a longitudinal ridge or protrusion.

FIG. 1 shows an exemplary tub design in accordance with the principles described herein. The features which allow the tub shown in FIG. 1 to be manufactured by moulding will become apparent by considering FIG. 1 in combination with FIG. 2.

Figure 2:
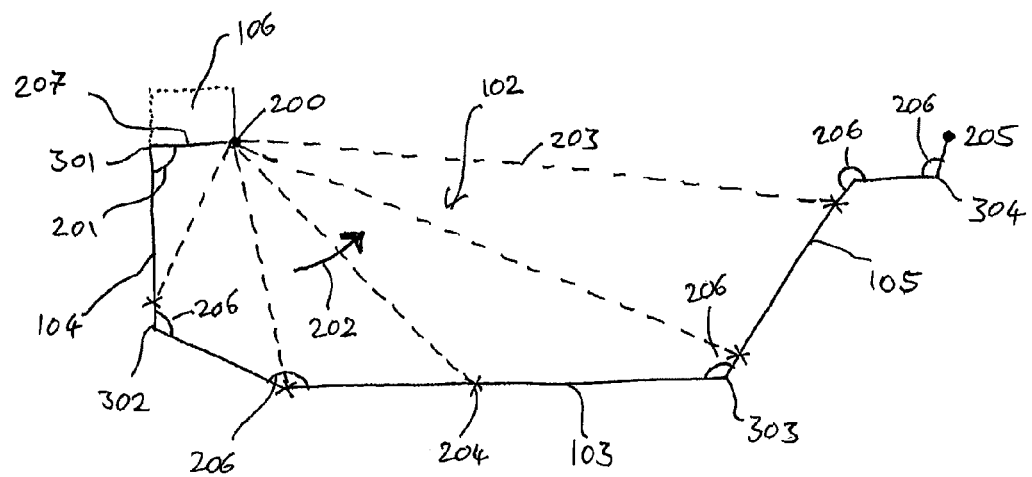
FIG. 2 is a schematic drawing of a cross-section through the tub shown in FIG. 1.

FIG. 2 shows a cross-section through the tub along the centreline indicated by dotted line 108 in FIG. 1 which stretches longitudinally between the front and rear walls. It can be seen from FIG. 2 that the strengthening member is a substantially hollow beam of substantially rectangular cross-section. However the strengthening member could be a shelf or a beam of any other cross-section (e.g. triangular) and the surfaces of the strengthening member could be curved rather than flat. Specifically, the cross-sectional profile shown in FIG. 2 is of the interior surfaces of the front and rear walls and the floor—that is, the surfaces of those parts of the tub which face into compartment 102. The walls and floor will have a finite thickness and could be multi-walled structures or define cavities for additional strength. The exterior surfaces of the walls and floor may therefore have a different profile to that of the interior surfaces.

The cross-sectional profile of the interior surfaces of the tub shown in FIG. 1 in all planes parallel to the centreline 108 and perpendicular to the floor 103 (i.e. parallel to the plane through the tub which defines the cross-section shown in FIG. 2) will be similar to the profile shown in FIG. 2. The profile of the interior of the tub is selected so that the following is true for all such planes through the main compartment: the length of an illustrative line (dashed line 203) drawn between a fixed point 200 on the most rearward part of the strengthening member in the plane and a movable point 204 confined to the profile of the interior of the tub in the plane monotonically increases in length as point 204 traces the profile from the fixed point in a generally longitudinal direction down the front wall, along the floor and up the rear wall in the plane. In FIG. 2, the interior surfaces of the strengthening member which form part of the interior profile of the tub are shown as unbroken lines. Those surfaces of the strengthening member which do not form part of the interior profile of the tub are shown as dotted lines.

Furthermore, the interior surfaces of compartment 102 are further configured such that each of the set of planes parallel to centreline 108 and perpendicular to floor 103 intersects the interior surfaces of the side walls of the tub or the floor only once along a single continuous line or at a common plane (a cross-sectional plane would meet a side wall at a common plane where the interior side wall lies in that cross-sectional plane). A plane intersects a surface where the plane passes through (i.e. forms a line) or shares a common plane with the surface, and a plane would intersect a surface twice if the plane passed through the surface a second time (i.e. because the surface bends back towards the plane). In other words, the angles between the side walls and the floor and between adjacent sections of the floor must not be less than 90 degrees. This ensures that a tub configured in accordance with the principles described herein does not have any cavities in its side walls or in the side of a longitudinal ridge in its floor. Such cavities would cause a tool piece filling the volume of the main compartment from being released after moulding.

Arranging a tub to have the profile described above in relation to FIG. 2 ensures that all internal angles 206 between interior surfaces of the tub are greater than 90 degrees and that internal angle 201 between the lower surface 207 of the strengthening member and front wall 104 is at least 90 degrees. Most preferably internal angle 201 between the strengthening member and the front wall is also greater than 90 degrees.

If the strengthening member is a shelf then the fixed point 200 lies on the most rearward edge of the strengthening member. A shelf can be any thin sheet projecting from the front wall towards the back wall having a flat, curved or multi-faceted profile. Similarly, if the strengthening member is a beam, the beam may comprise a set of flat or curved surfaces forming an open or closed structure. One or more of the surfaces are common with the front wall, as shown in FIG. 2. Preferably the strengthening member is a closed box-section beam.

Figure 3:
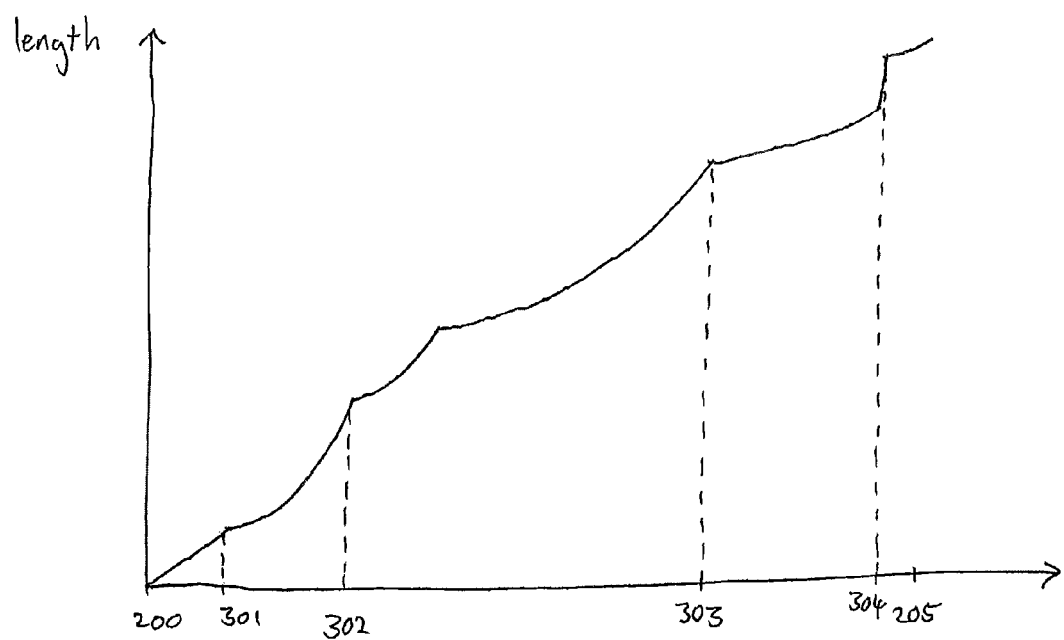
FIG. 3 is a rough plot of the variation in length of a line extending from point P in FIG. 2 to the tub as the end of the line moves along the tub from A to B.

FIG. 3 shows a rough plot of the variation in length of illustrative line 203 as its movable end 204 traces the profile of the interior surfaces of the tub from fixed point 200 around to the rearmost point 205 of the rear wall in the plane through the centreline of the tub. The direction of rotation of line 203 about point 200 as point 204 moves along the profile of the tub is indicated by arrow 202. It can be seen from the plot that the length of line 203 increases monotonically—that is, the length of the line does not at any point decrease but always increases or stays the same length. The length of an illustrative line 203 in other planes through the main compartment parallel to the centreline 108 and perpendicular to the floor 103 exhibits a similar monotonic variation for a tub configured in accordance with the present invention.

Various points on the cross-section through the tub along its centreline are marked on FIGS. 2 and 3 so as to illustrate the variations in length of the illustrative line 203. From fixed point 200 the length of line 203 increases linearly because moveable point 204 traces along lower surface 207 of the strengthening member. Between points 301 and 302 the length of the line increases in a sinusoidal fashion since line 203 forms an hypotenuse to the adjacent 207 and opposite 104. Similar variations are observed between points 302 and 303, 303 and 304, and 304 to 205. Other variations in the length of line 203 would be observed for curved sections of the tub. A sharp increase in the length of line 203 is observed prior to point 304 because section 110 of the rear wall extends almost directly away from the fixed point.

In order to mould a complex shape in a fibre reinforced composite material, a tool having multiple rigid tool pieces must be developed which, when the pieces are brought together, defines the shape of the desired article. Typically, mats of the fibre material (such as carbon fibre) are laid in the cavity, the tool pieces are brought together so as to provide even pressure over the mats and then a liquid matrix is pumped into the mould. Once the matrix has been cured, one or more tool pieces are withdrawn so as to release the finished article. In the case of resin transfer moulding (RTM), the matrix is a liquid resin pumped into the mould under pressure. The flow of resin through the fibre mats is often aided by pumping air from the mould so as to lower the pressure in the mould.

Conventional composite tub designs have a main compartment having an internal profile which would require multiple tool pieces to define. Since the tool pieces would have to be removed from the main compartment after the tub has been cured, the tool pieces would have to be configured to be releasable in a particular order and according to particular rotational and translational motions. This would result in a very complex arrangement of linkages, sliders and other parts which would be difficult and expensive to design, prone to failure and make it difficult to maintain the required tolerances of the mould.

The number of tool pieces required to mould the external surfaces of an article is less important because there is significantly more spatial freedom around an article in which to remove the external tool pieces. Also, each of the external tool pieces can be supported by other structures (e.g. a frame on which the mould rests), which reduces the complexity of interlocking mechanisms between the external tool pieces.

Figure 4:
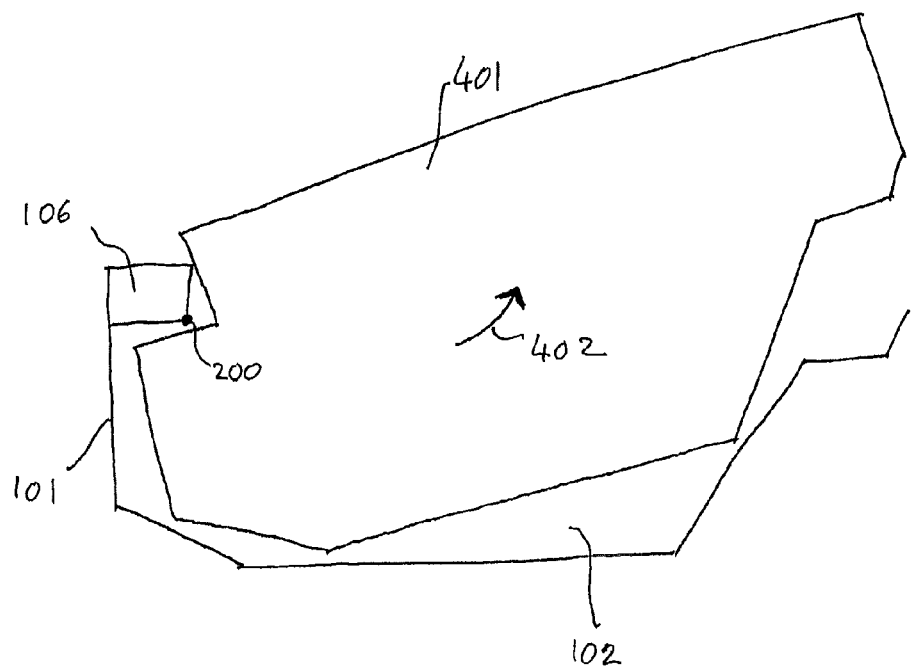
FIG. 4 is a schematic diagram showing a single-piece tool part being removed from the main compartment of the tub.

The interior profile of a tub described herein allows the tub to be moulded using a single rigid tool piece for the main compartment because the profile is carefully chosen so as to allow such a tool piece to be removed from the tub. The removal of a single tool piece from the main compartment is shown in FIG. 4. Single rigid tool piece 401 is sized to fill compartment 102 during moulding so as to define the shape of the interior surfaces of the compartment. Once moulding is complete and the tub 101 has been cured, tool piece 401 can be removed from compartment 102 by a motion which includes rotation of the tool piece about strengthening member 106, as indicated by arrow 402. In other words, tool piece 401 is removed by a motion which includes rotation of the tool piece about an axis generally defined by the set of fixed points 200 along the strengthening member. Tool piece 401 can be removed from the compartment without deformation of the composite tub. This is possible because the profile of the compartment is configured in accordance with the principles described above in relation to FIGS. 2 and 3, and does not have any surfaces by which the tool piece 401 could be trapped. The external surfaces of the tub can be mouldable by any number of tool pieces since it is much more straightforward to design and configure the tool pieces required for moulding the exterior surfaces of a complex article.

Furthermore, because the tub design includes a strengthening member it does not require further composite structures to be bonded to the front wall of the tub to provide it with the necessary strength and stiffness. Prior tub designs do not teach how to provide a strengthening member that is well separated from the tub floor and which allows the tub to be manufactured using conventional moulding techniques without great difficulty and expense. The combination of the strengthening member and shelf-like sections provided in the rear wall (i.e. the corrugated surface defined by sections 109, 110 and 111 in the tub shown in FIG. 1), possibly combined with side walls 107, can provide all the stiffness required. Also, as the strengthening member projects into the main compartment of the tub, the design is longitudinally compact.

All of the structures of the tub shown in FIG. 1, including the strengthening member, can be created during a single moulding process by means of a moulding tool that is not prohibitively complex and expensive. In particular, a tub configured in accordance with the present invention can be manufactured using resin transfer moulding, which is a technique that can rapidly produce excellent quality fibre reinforced composites.

The present invention provides several advantages to a vehicle manufacturer and opens the door to mass production of structural composite tubs. Aside from reducing the cost of the moulding apparatus over that of apparatus for moulding tubs having a conventional design, the invention also allows for a reduction in cycle time between mouldings and a reduction in the failure rate of the moulding process and the need to scrap expensive carbon fibre. In order to prevent the liquid resin used in composite moulding techniques from being forced out of the mould between tool pieces, it is necessary to provide a silicon seal between tool pieces. This seal must be cleaned between moulding cycles, which leads to significant periods of time in which the moulding apparatus cannot be used for moulding. The seal, which is generally made of silicone, also has limited durability in comparison to the tool pieces and will frequently fail when the silicone splits under the pressures of the moulding cycle. When the seal does fail the composite tub must be scrapped. A tub configured in accordance with the teachings herein requires only a single tool piece for the interior of the tub, reducing the number of tool pieces and hence the number of required seals. In fact, the single tool piece for defining the main compartment of the tub does not require any seals at all.

Because a composite tub as described herein can be moulded at a greater rate, it is important to use metal tool pieces rather than composite tool pieces. Composite tool pieces have limited longevity and generally only last around 100 moulding cycles. In comparison, a metal tool piece can last for over 30,000 moulding cycles. The use of metal tool pieces further allows for increased tolerances of a moulded article and hence for improved alignment of the tub.

Although a composite tub as described herein can be moulded by means of a moulding tool having a single interior tool piece for defining the main compartment of the tub, the tub could of course be moulded in a tool having two or more pieces for defining the main compartment of the tub. The features of the tub which allow a single interior tool piece to be used provide similar benefits when a tool having multiple interior tool pieces is used. For example, the fact that the interior tool pieces can be easily released from the tub post moulding means that the interactions between the interior tool pieces (their relative motions, the need for linkages and sliders etc.) can be much more straightforward than is the case with if the tub had a conventional design.

Although the strengthening member has been described herein as being integral with the front wall, the strengthening member could in fact be integral with any wall of a tub—side wall or rear wall. Front, rear and side are simply relative terms defined in relation to the vehicle in which the tub is to be used. The tub need not be oriented in such a manner in a vehicle and could be arranged such that the strengthening member is at the rear or side of a vehicle, with the nomenclature of the walls being modified accordingly.

Note that any of the walls or the floor of the tub may comprise holes extending completely through that wall or floor of the tub. These can be useful to provide access between the exterior and interior of the tub when it is installed in a vehicle. Such holes are ignored for the purposes of defining the cross-section of the interior surfaces of the tub.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A moulded structural tub for a vehicle, the tub having:
   a main compartment bounded by a first lateral wall, a second lateral wall, and a floor extending between the lateral walls;
   a strengthening member integral with the first lateral wall and projecting in a longitudinal direction from the first lateral wall towards the second lateral wall;
   the profile of the surfaces of the main compartment being such that, in any cross-sectional plane parallel to the longitudinal direction and perpendicular to the plane generally defined by the floor, the length of a line drawn in that cross-sectional plane between
   a fixed point on that part of the strengthening member closest to the second lateral wall, and
   a movable point confined to the profile
   monotonically increases in length as the movable point on the profile is moved in a generally longitudinal direction so as to trace from the fixed point along the profile of the first lateral wall, the floor and the second lateral wall in an unbroken set of points representing the cross-section of the surfaces of the main compartment in that cross-sectional plane;
      wherein each of the said cross-sectional planes which meet the surface of the floor in the main compartment intersect the floor once along a single continuous line or at a common plane.

2. A moulded structural tub as claimed in claim 1, wherein the strengthening member is one of a substantially hollow beam, a flat sheet, a curved sheet and a multi-faceted sheet comprising a plurality of sheet sections.

3. A moulded structural tub as claimed in claim 1, wherein the strengthening member is remote from the floor along its length.

4. A moulded structural tub as claimed in claim 3, wherein the first lateral wall terminates at the strengthening member along the edge of the first lateral wall remote from the floor.

5. A moulded structural tub as claimed in claim 1, wherein in all said cross-sectional planes the angle between the first lateral wall and that part of the strengthening member closest to the floor is greater than 90degrees.

6. A moulded structural tub as claimed in claim 1, further comprising third and fourth lateral walls bounding the main compartment, each of the third and fourth lateral walls extending between the first and second lateral walls and meeting the floor along a common lateral edge.

7. A moulded structural tub as claimed in claim 6, wherein the strengthening member extends between the third and fourth lateral walls.

8. A moulded structural tub as claimed in claim 6, wherein each of the said cross-sectional planes which meet the third or fourth walls in the main compartment intersect the third or fourth wall once along a single continuous line or at a common plane.

9. A moulded structural tub as claimed in claim 1, wherein the second lateral wall comprises either a single curved section or multiple curved or planar sections so as to increase the torsional stiffness of the moulded structural tub about the longitudinal direction.

10. A moulded structural tub as claimed in claim 1, wherein the profile of the surfaces of the main compartment is configured such that a single rigid tool part of a moulding apparatus, having dimensions such that when the tool part is positioned in the main compartment the tool part snugly abuts all the surfaces of the main compartment, can be removed from the main compartment by a motion including rotation about the strengthening member without deformation to the moulded tub.

11. A moulded structural tub as claimed in claim 10, wherein the single rigid tool part can be removed from the main compartment by a motion including rotation about an axis perpendicular to the longitudinal direction in a plane perpendicular to the plane generally defined by the floor.

12. A moulded structural tub as claimed in claim 10, wherein the single rigid tool part can be removed from the main compartment by a motion including rotation about an axis generally defined by the complete set of fixed points of the said cross-sectional planes.

13. A moulded structural tub as claimed in claim 10, wherein the moulding apparatus is a resin transfer moulding apparatus and the tub is moulded by resin transfer moulding.

14. A moulded structural tub as claimed in claim 1, wherein all parts of the tub are moulded together in a single fibre reinforced composite piece.

15. A moulded structural tub as claimed in claim 1, wherein the tub is made from carbon fibre reinforced polymer.

16. A moulded structural tub as claimed in claim 1, wherein the tub is a structural platform for an automobile and the main compartment of the tub is configured to partially enclose at least one seating position for an occupant of the vehicle.

17. A moulded structural tub as claimed in claim 2, wherein the strengthening member is remote from the floor along its length.

18. A moulded structural tub as claimed in claim 4, wherein the first lateral wall terminates at the strengthening member along the edge of the first lateral wall remote from the floor.

19. A moulded structural tub as claimed in claim 6, wherein each of the said cross-sectional planes which meet the third or fourth walls in the main compartment intersect the third or fourth wall once along a single continuous line or at a common plane.

20. A moulded structural tub as claimed in claim 14, wherein the single rigid tool part can be removed from the main compartment by a motion including rotation about an axis generally defined by the complete set of fixed points of the said cross-sectional planes.

21. A moulded structural tub as claimed in claim 1, wherein the moulded structural tub is a single piece moulded structural tub.

* * * * *